United States Patent [19]
Li et al.

[11] Patent Number: 5,945,186
[45] Date of Patent: Aug. 31, 1999

[54] AIRBAG FABRIC COATED WITH A POROSITY BLOCKING CROSS-LINKED ELASTOMERIC RESIN

[75] Inventors: Shulong Li; Robert C. Arnott, both of Spartanburg, S.C.

[73] Assignee: Milliken Research Corporation, Spartanburg, S.C.

[21] Appl. No.: 09/112,995

[22] Filed: Jul. 10, 1998

Related U.S. Application Data

[63] Continuation-in-part of application No. 08/980,926, Dec. 1, 1997.

[51] Int. Cl.$^6$ .................................................. B29D 22/00
[52] U.S. Cl. ......................... 428/36.1; 442/65; 442/168; 442/226
[58] Field of Search .............................. 428/36.1; 442/65, 442/168, 226

[56] References Cited

U.S. PATENT DOCUMENTS

| | | |
|---|---|---|
| 3,705,645 | 12/1972 | Konen . |
| 3,871,946 | 3/1975 | Romanski et al. .......................... 161/88 |
| 3,932,559 | 1/1976 | Cantor et al. ............................ 260/847 |
| 4,217,256 | 8/1980 | Peerman et al. . |
| 4,433,493 | 2/1984 | Poisson ..................................... 34/116 |
| 4,921,735 | 5/1990 | Bloch . |
| 4,994,225 | 2/1991 | Davis . |
| 5,073,418 | 12/1991 | Thornton et al. . |
| 5,110,666 | 5/1992 | Menzel et al. . |
| 5,114,180 | 5/1992 | Kami et al. ............................... 280/743 |
| 5,178,408 | 1/1993 | Barrenscheen et al. ................. 280/728 |
| 5,178,938 | 1/1993 | Magistro et al. ........................ 428/252 |
| 5,208,097 | 5/1993 | Honma et al. . |
| 5,312,690 | 5/1994 | Fukuda et al. ........................... 428/447 |
| 5,399,402 | 3/1995 | Inoue et al. . |
| 5,421,378 | 6/1995 | Bowers et al. . |
| 5,503,197 | 4/1996 | Bower et al. . |
| 5,529,837 | 6/1996 | Fujiki et al. . |
| 5,593,941 | 1/1997 | Kato et al. ............................... 503/227 |
| 5,618,595 | 4/1997 | Matsushima et al. .................. 428/35.2 |

OTHER PUBLICATIONS

ASTM D737–96, "Standard Test Method for Air Permeability of Textile Fabrics" Apr. 1996.

*Primary Examiner*—Helen L. Pezzuto
*Attorney, Agent, or Firm*—Terry T. Moyer; William S. Parks

[57] ABSTRACT

A coated base fabric for use in an automotive airbag is provided. The coated base fabric includes a substrate of woven nylon or polyester which is overcoated with a porosity blocking layer of a cross-linked elastomeric resin. Such a resin may be, without limitation, selected from the group consisting essentially of polyamide, butyl rubber, EPDM, polyurethane, hydrogenated NBR, acrylic rubbers, and mixtures thereof. The porosity blocking layer of polyamide material is present at a coating weight of between about 0.1 and 0.5 ounces per square yard. Furthermore, the resin may be present as either a latex or in solution with an organic solvent or solvents. A method for producing the coated fabric of the present invention is also provided.

11 Claims, No Drawings

AIRBAG FABRIC COATED WITH A POROSITY BLOCKING CROSS-LINKED ELASTOMERIC RESIN

CROSS-REFERENCE TO RELATED APPLICATION

This application is a continuation-in-part of co-pending application of U.S. patent application Ser. No. 08/980,926, filed on Dec. 1, 1997, of Shulong Li et al. for Polyamide Coated Airbag Fabric, now allowed. This application is incorporated herein by reference.

FIELD OF THE INVENTION

This invention relates generally to coated fabrics and more particularly concerns fabrics for use in automotive restraint cushions which have low permeability, yet avoid the use of heavy coatings such as neoprene, silicones and the like, which have historically been used. More specifically, the present invention relates to a coated airbag fabric, which includes a very light coating of water-dispersed finely divided stable cross-linked elastomeric resin material. The elastomeric coating is applied across one or both sides of a nylon or polyester substrate fabric at dry coating weights of about 0.6 ounces or less per square yard. All cross-linked elastomeric resins are intended to be within the scope of this invention. Of particular interest are polyamides, polyurethanes, and hydrogenated acrylonitrile-butadiene rubbers (hydrogenated NBR), as well as ethylene-propylene-diene comonomer rubber (EPDM), butyl rubbers, and acrylic rubbers.

BACKGROUND OF THE PRIOR ART

Airbags for motor vehicles are known and have been used for a substantial period of time. A typical construction material for airbags has been a polyester or nylon fabric, coated with an elastomer such as neoprene, or silicone. The fabric used in such bags is typically a woven fabric formed from synthetic yarn by weaving practices which are well known in the art.

The coated material has found acceptance because it acts as an impermeable barrier to the inflation medium. This inflation medium is generally a nitrogen gas generated from a gas generator or inflator. Such gas is conveyed into the cushion at a relatively warm temperature. The coating obstructs the permeation of the fabric by such hot gas, thereby permitting the cushion to rapidly inflate without undue decompression during a collision event.

Airbags may also be formed from uncoated fabric which has been woven in a manner that creates a product possessing low permeability or from fabric that has undergone treatment such as calendaring to reduce permeability. Fabrics which reduce air permeability by calendaring or other mechanical treatments after weaving are disclosed in U.S. Pat. No. 4,921,735; U.S. Pat. No. 4,977,016; and U.S. Pat. No. 5,073,418 (all incorporated herein by reference).

The coating of a fabric with an elastomer such as neoprene typically requires the application of that elastomer from a solution in a volatile solvent. This solvent must then be evaporated and the elastomeric system cured. Typical dry coating weights for neoprene have been in the range of about 1 ounce per square yard or greater. Silicone coatings typically utilize either solvent based or complex two component point of application reaction systems. Dry coating weights for silicone have been in the range of about 0.7 ounces per square yard or greater. As will be appreciated, high add on weights substantially increase the cost of the base fabric for the airbag as well as making the eventual sewing of the fabric into an airbag structure more difficult.

The use of certain polyurethanes as coatings as disclosed in U.S. Pat. No. 5,110,666 to Menzel et al. (incorporated by reference) permits low add on weights reported to be in the range of 0.1 to 1 ounces per square yard but the material itself is relatively expensive and is believed to require relatively complex compounding and application procedures due to the nature of the coating materials. Patentee, however, utilizes strictly linear thermoplastic polyurethanes within his coating and permits above 0.5 ounces per square yard of such a coating to be present on the fabric. Such teachings clearly do not anticipate or fairly suggest the required coatings and amounts present of such coating on the inventive airbag fabric.

In light of the background above, it can be readily seen that there exists a need for an airbag base fabric which provides controlled low permeability through use of a coating which provides an effective barrier to air permeability while nonetheless avoiding the inherent complexity and cost of materials which have heretofore been utilized. Accordingly, this invention is directed to a coated base fabric for an airbag comprising a polyester or polyamide substrate fabric coated with a porosity blocking layer of a cross-linked elastomeric coating resin. The term porosity blocking layer is intended to encompass the amount necessary to obtain a fabric which possesses suitable air permeability characteristics while also providing a coating which passes a storage separation (or blocking) test. Any stable elastomer resin can be utilized within this invention as long as the resin is cross-linked on the fabric surface and is applied at a coating weight of between about 0.1 and 0.5 ounces per square yard of fabric. By stable elastomer resin, it is meant that such a resin exhibits a glass transition temperature ($T_g$) of below room temperature (i.e., from about 20 to about 25° C.). Such a $T_g$ measurement indicates the presence of elastomeric properties for the specific material. Of particular interest as cross-linked stable elastomeric resins are polyamides, polyurethanes, and hydrogenated NBR, EPDM, butyl rubber, and acrylic rubbers.

When a thin coating of cross-linked elastomeric resin is added to airbag fabric, it has discovered that such a fabric exhibits superior blocking test results as well as necessary and beneficial air permeability characteristics, particularly in view of the prior art. Other objects and advantages of the invention will become apparent upon reading the following detailed description.

The cross-linking requirement is of utmost importance in this invention since it was discovered that the beneficial properties were obtained solely through the utilization of a cross-linked elastomeric resin. Such a cross-linked coating is produced through the addition of a cross-linking agent to the coating formulation or is supplied through the utilization of a self-cross-linking resin. Cross-linked resins provide the necessary mechanical properties (i.e., enhanced tensile strength) and aging stability for the elastomeric resin coating at the requisite low coating weight level. A non-cross-linked resin does not provide such necessary properties.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

DETAILED DESCRIPTION OF THE INVENTION

As previously indicated, in many airbag applications a coating is desirable to permit the rapid and complete inflation of the restraint cushion during a collision event. This need for a coating is particularly significant with respect to driver side and side impact bags where there is little distance between the occupant and the cushion. Coatings may be particularly important in newly developed curtain type cushion structures wherein prolonged inflation (i.e. for several seconds) may be desired.

Such airbag fabrics must pass certain tests in order to be utilized within restraint systems. One such test is called a blocking test which indicates the force required to separate two portions of coated fabric from one another after prolonged storage in contact with each other (such as an airbag is stored). Laboratory analysis for blocking entails pressing together coated sides of two 2 inch by 2 inch swatches of airbag fabric at 5 psi at 120° C. for 7 days. If the force required to pull the two swatches apart after this time is greater than 50 grams per square yard, or the time required to separate the fabrics utilizing a 50 gram weight suspended from the bottom fabric layer is greater than 10 seconds, the coating fails the blocking test. Clearly, the lower the required separating shear force, the more favorable the coating.

Another test which the specific coated fabric must pass is the oven aging test. Such a test also simulates the storage of an airbag fabric over a long period of time upon exposure at high temperatures and actually is used to analyze alterations of various different fabric properties after such a prolonged storage in a hot ventilated oven (>100° C.) for 2 or more weeks. For the purposes of this invention, this test was used basically to analyze the air permeability of the coated fabric after storage under a pressure of about 125 Pascals. Airbag fabrics generally should exhibit an air permeability level of less than about 0.2 cfm at 125 Pa. Again, the lower the air permeability, the better the coating.

Surprisingly, it has been discovered that any cross-linked stable elastomeric resin coated onto an airbag fabric surface at a weight between about 0.1 and 0.5 ounces per square yard provides a coated fabric which passes both the blocking test and oven aging test with very low air permeability. This unexpectedly beneficial type and amount of coating thus provides an airbag fabric which will easily inflate after prolonged storage and will remain inflated for a sufficient amount of time to ensure an optimum level of safety within a restraint system. Furthermore, it goes without saying that the less coating composition required, the less expensive the final product. Additionally, the less coating composition required will translate into a decrease in the packaging volume of the airbag fabric within an airbag device. This benefit thus improves the packability for the airbag fabric.

The substrate across which the cross-linked elastomeric resin coatings are applied to form the airbag base fabric in accordance with the present invention is preferably a plain woven fabric formed from yarns comprising polyamide or polyester fibers. Such yarn preferably has a linear density of about 210 denier to about 630 denier. Such yarns are preferably formed from multiple filaments wherein the filaments have linear densities of about 6 denier per filaments or less and most preferably about 4 denier per filament or less. Such substrate fabrics are preferably woven using fluid jet weaving machines as disclosed in U.S. Pat. Nos. 5,503,197 and 5,421,378 to Bower et al. (incorporated herein by reference). The fabric substrate with applied coating will hereinafter be referred to as an airbag base fabric. Other possible components present within the cross-linked elastomeric resin coating composition are thickeners, antioxidants, flame retardants, coalescent agents, adhesion promoters, and colorants.

In accordance with the potentially preferred practices of the present invention, a water borne microdispersion of finely divided elastomeric resin (such as self-cross-linking polyamide resin particles) is compounded with a thickener and a flame retardant to yield a compounded mix having a viscosity of about 8000 centipoise or greater. The potentially preferred polyamide dispersion is marketed under the trade designation MICROMID™ 632 hpl by Union Camp Corporation which is believed to have a place of business in Wayne, N.J. Other preferred cross-linked elastomeric resins include polyurethane, such as Witcobond™ 253 (35% solids), from Witco, and Sancure, from BFGoodrich, Cleveland, Ohio; hydrogenated NBR, such as Chemisat™ LCH-7335X (40% solids), from Goodyear Chemical, Akron, Ohio; EPDM, such as EP-603A rubber latex, from Lord Corporation, Erie, Pa.; butyl rubber, such as Butyl rubber latex BL-100, from Lord Corporation; and acrylic rubber (elastomers), such as HyCar™, from BFGoodrich. A potentially preferred thickener is marketed under the trade designation NATROSOL™ 250 HHXR by the Aqualon division of Hercules Corporation which is believed to have a place of business at Wilmington, Del. The cross-linking agent may be any such compound which is well known in the art, such as melamine formaldehyde, and the like.

In order to meet Federal Motor Vehicle Safety Standard 302 flame retardant requirements for the automotive industry, a flame retardant is also preferably added to the compounded mix. One potentially preferred flame retardant is AMSPERSE F/R 51 marketed by Amspec Chemical Corporation which is believed to have a place of business at Gloucester City N.J.

Once compounding is complete, the formulation is preferably scrape-coated across the fabric substrate and dried and cured to form a thin coating. Scrape coating in this sense includes, and is not limited to, knife coating, in particular knife-over-gap table, floating knife, and knife-over-foam pad methods, to name a few different method types. Such scrape coating permits most of the coating resin to remain within the interstices of the yarns of the airbag fabric. It is within these interstices that air is most likely to leak from an inflated airbag without any coating present. Furthermore, scrape coating permits very little resin to be applied to the raised yarn of the airbag fabric at this low coating weight. As a result, this particular distribution of coating materials on the surface of the airbag fabric allows the cross-linked elastomeric resin coating to seal the fabric while the low coating weight also simultaneously restricts contact between resin samples located on different portions of the fabric surface. This characteristic is very important to ensure the subject fabric will pass the required blocking test, described above.

The final dry weight of the coating is preferably about 0.4 ounces per square yard or less and most preferably 0.2–0.35 ounces per square yard or less. The resultant base fabric is substantially impermeable to air when measured according to ASTM Test D737, "Air Permeability of Textile Fabrics," standards.

As previously indicated, the substrate fabric is preferably a woven nylon material. In the most preferred embodiment such substrate fabric will be formed from fibers of nylon 6,6. It has been found that such polyamide materials exhibit particularly good adhesion and maintenance of resistance to hydrolysis when used in combination with the coating according to the present invention.

PREFERRED EMBODIMENTS OF THE INVENTION

In order to further describe the present invention the following nonlimiting examples are set forth. The polyamide elastomer discussed above and described in more detail below is the most preferred embodiment of the invention. These examples are provided for the sole purpose of illustrating some preferred embodiments of the invention and are not to be construed as limiting the scope of the invention in any manner.

EXAMPLE 1

A mix was prepared using the following constituents wherein all parts are by weight.

| | |
|---|---|
| Self-cross-linking Polyamide Resin (MICROMID 632 hpl) (35% solids) | 100 grams |
| NATROSOL 250 HHXR | 2.6 grams |
| Flame retardant (DE-83R, from Great Lakes Chemical Corporation, West Lafayette, IN) | 2 grams |
| Water | 80 grams |

The viscosity of the resultant mix was about 15,000 centipoise as measured by a Brookfield viscometer. This mix was coated on to a 420 denier Nylon 6,6 airbag fabric substrate using a knife-over-gap coater and dried at 320° F. for 3 minutes. The dry coating weight was 0.25 ounces per square yard. Air permeability measured at 125 Pa is 0.0 cfm per square foot of fabric (as tested in accordance with the ASTM D737 Method) and the coating passed the blocking test.

EXAMPLE 2

A mix was prepared using the following constituents.

| | |
|---|---|
| Witcobond 253 | 105 grams |
| Cross-linking agent (Aerotex M-3, from Freedom Textile Chemicals Co., Charlotte, North Carolina) | 2 grams |
| Flame retardant (DE-83R, from Great Lakes Chemical Corporation, West Lafayette, IN) | 2 grams |
| Natrosol 250 | 2.6 grams |
| Water | 80 grams |

The viscosity of the resultant mix was about 15,000 centipoise. This mix was coated on to a 420 denier Nylon 6,6 airbag fabric substrate using a knife-over-gap coater and dried at 320° F. for 3 minutes. The dry coating weight was 0.3 ounces per square yard. Air permeability measured at 125 Pa was 0.0 cfm and this coated fabric passed the blocking test.

EXAMPLE 3

| | |
|---|---|
| MICROMID 632 hpl (35% solids) | 120 parts |
| NATROSOL 250 HHXR | 2.5 parts |
| AMSPERSE F/R 51 (70% solids) | 15 parts |
| Water | 40 Parts |

The viscosity of the resultant mix was about 15,000 centipoise. This mix was coated on to a 420 denier Nylon 6,6 airbag fabric substrate using a knife-over-gap coater and dried at 350° F. for 3 minutes. The dry coating weight was 0.35 ounces per square yard. Air permeability measured at 125 Pa was 0.0 cfm per square foot of fabric and the coating passed the blocking test.

EXAMPLE 4

| | |
|---|---|
| Chemisat LCH-733X | 90 grams |
| NATROSOL 250 HHXR | 2.5 grams |
| DE-83R | 4 grams |
| Water | 60 grams |

The viscosity of the resultant mix was about 15,000 centipoise. This mix was coated on to a 420 denier Nylon 6,6 airbag fabric substrate using a knife-over-gap coater and dried at 350° F. for 3 minutes. The dry coating weight was 0.3 ounces per square yard. Air permeability measured at 125 Pa was 0.0 cfm per square foot of fabric and the coating passed the blocking test.

EXAMPLE 5 (Comparative)

The same formulation utilized in EXAMPLE 1 was prepared but knife-coated onto the airbag fabric at a coating weight of 0.55 ounces per square yard. The air permeability was again measured to be 0.0 cfm, as above; however, this coating did not pass the blocking test.

EXAMPLE 6 (Comparative)

A coating was tested which was not a cross-linked resin. The formulation was as follows:

| | |
|---|---|
| Micromid 144 LTL (Thermoplastic polyamide) | 100 grams |
| NATROSOL 250 HHXR | 2.6 grams |
| DE-83R | 2 grams |
| Water | 80 grams |

The viscosity of the resultant mix was about 15,000 centipoise. This mix was coated on to a 420 denier Nylon 6,6 airbag fabric substrate using a knife-over-gap coater and dried at 350° F. for 3 minutes. The dry coating weight was 0.3 ounces per square yard. This coating passed the blocking test; however sample fabrics failed the air permeability test by exhibiting from between 0.5 and 1 cfm at 125 pa after the standard prolonged high temperature storage of ASTM D737.

There are, of course, many alternative embodiments and modifications of the present invention which are intended to be included within the spirit and scope of the following claims.

What is claimed is:

1. A coated base fabric for an airbag comprising a polyester or polyamide substrate fabric coated with a cross-linked elastomeric coating resin;

wherein said cross-linked elastomeric coating resin is present on a dry basis at a level of not greater than about 0.6 ounces per square yard;

wherein said cross-linked elastomeric coating resin forms an effective barrier to air flow such that (a) said coated base fabric exhibits an air permeability level of less than about 0.2 cfm at 125 Pa and (b) two portions of the coated fabric pass the blocking test after prolonged storage in contact with each other; and wherein said cross-linked elastomeric coating resin is selected from the group consisting of butyl rubber, EPDM, polyurethane, hydrogenated NBR, acrylic rubbers, and any mixtures thereof.

2. The coated base fabric as in claim 1, wherein said layer of cross-linked elastomenrc coating resin material is present on a dry basis at a coating weight between about 0.1 and 0.5 ounces per square yard of fabric.

3. The coated base fabric as in claim 2, wherein said polyamide substrate fabric is formed from nylon 6,6 fiber.

4. The coated base fabric as in claim 1, wherein said substrate fabric is woven from multifilament yarn characterized by a linear density of about 210–630 denier.

5. The coated base fabric as in claim 4, wherein said multifilament yarn is characterized by a filament linear density of about 4 denier per filament or less.

6. The coated base fabric as in claim 1, wherein said cross-linked elastomeric coating resin is butyl rubber.

7. The coated base fabric as in claim 1, wherein said cross-linked elastomeric coating resin is EPDM.

8. The coated base fabric as in claim 1, wherein said cross-linked elastomeric coating resin is polyurethane.

9. The coated base fabric as in claim 1, wherein said cross-linked elastomeric coating resin is hydrogenated NBR.

10. The coated base fabric as in claim 1, wherein said cross-linked elastomeric coating resin is present in the form of a latex.

11. The coated base fabric as in claim 1, wherein said cross-linked elastomeric coating resin is present in solution in an organic solvent.

* * * * *

UNITED STATES PATENT AND TRADEMARK OFFICE
CERTIFICATE OF CORRECTION

PATENT NO. : 5,945,186
DATED : August 31, 1999
INVENTOR(S) : Shulong Li and Robert C. Arnott It is certified that error appears in the above-identified patent and that said Letters Patent is hereby corrected as shown below:

Column 7, line 11, after the word "cross-linked" substitute —elastomenrc— and insert —elastomeric—.

Signed and Sealed this

Twenty-ninth Day of May, 2001

*Attest:*

NICHOLAS P. GODICI

*Attesting Officer*     Acting Director of the United States Patent and Trademark Office